United States Patent
Kim (10) Patent No.: US 8,194,748 B2
(45) Date of Patent: Jun. 5, 2012

(54) APPARATUS FOR SCALABLE ENCODING/DECODING OF MOVING IMAGE AND METHOD THEREOF

(75) Inventor: Hae-kwang Kim, Seoul (KR)

(73) Assignees: Samsung Electronics Co., Ltd., Suwon-si (KR); Sejong Industry—Academy Cooperation Foundation, Seoul (KR)

( * ) Notice: Subject to any disclaimer, the term of this patent is extended or adjusted under 35 U.S.C. 154(b) by 1599 days.

(21) Appl. No.: 11/076,012

(22) Filed: Mar. 10, 2005

(65) Prior Publication Data

US 2005/0265442 A1 Dec. 1, 2005

(30) Foreign Application Priority Data

May 27, 2004 (KR) .................. 10-2004-0037690

(51) Int. Cl.
H04N 7/12 (2006.01)
H04N 11/02 (2006.01)
H04N 11/04 (2006.01)
(52) U.S. Cl. ................................. 375/240.21
(58) Field of Classification Search ............. 375/240.21
See application file for complete search history.

(56) References Cited

U.S. PATENT DOCUMENTS

| 5,742,343 | A | * | 4/1998 | Haskell et al. | .......... 375/240.15 |
| 6,493,387 | B1 | | 12/2002 | Shin et al. | |
| 6,697,521 | B2 | * | 2/2004 | Islam et al. | .................. 382/166 |
| 7,313,814 | B2 | * | 12/2007 | Zhu et al. | .......................... 726/6 |
| 2004/0042549 | A1 | | 3/2004 | Huang et al. | |
| 2005/0259729 | A1 | * | 11/2005 | Sun | ........................... 375/240.1 |

FOREIGN PATENT DOCUMENTS

| EP | 1 401 208 A1 | 3/2004 |
| EP | 1 601 204 A1 | 11/2005 |
| JP | 2001-332978 A | 11/2001 |
| KR | 2000-0005729 A | 1/2000 |
| KR | 10-2000-0025386 A | 5/2000 |
| WO | WO 99/56472 A1 | 11/1999 |

OTHER PUBLICATIONS

Shijun Sun; Quality Scalability for FRExt; Jul. 23, 2004; Joint Video Team of ISO/IEC MPEG & ITU-T VCEG.*
Li W: "Overview of Fine Granularity Scalability in MPEG-4 Video Standard", IEEE Transactions on Circuits and Systems for Video Technology, IEEE Inc. New York, US, vol. 11, No. 3, Mar. 2001, pp. 301-317, XP000994715.
Korean Decision of Grant, dated Jan. 25, 2011, issued in Application No. 10-2004-0037690.

* cited by examiner

*Primary Examiner* — Mehrdad Dastouri
*Assistant Examiner* — Jeremaiah Hallenbeck-Huber
(74) *Attorney, Agent, or Firm* — Sughrue Mion, PLLC (57) ABSTRACT

Provided are a scalable encoding/decoding apparatus and method for the same for a moving image of more than 8 bits. The scalable moving image encoding apparatus includes a pixel value clipper clipping a pixel value of an original image to a pixel value with a predetermined pixel depth, a base layer encoder receiving the clipped image and encoding the clipped image using a predetermined encoding method based on motion prediction, a pixel value scaler receiving a base layer image generated by the base layer encoder, which is a decoded image of an encoded image, and scaling a pixel depth of the base layer image to the pixel depth of the original image, and an enhancement layer encoder subtracting the base layer image having a scaled pixel value from the original image to form an enhancement layer image and encoding the enhancement layer image using a predetermined encoding method.

17 Claims, 8 Drawing Sheets

APPARATUS FOR SCALABLE ENCODING/DECODING OF MOVING IMAGE AND METHOD THEREOF

BACKGROUND OF THE INVENTION

This application claims priority from Korean Patent Application No. 10-2004-0037690, filed on May 27, 2004, in the Korean Intellectual Property Office, the disclosure of which is incorporated herein in its entirety by reference.

1. FIELD OF THE INVENTION

The present invention relates to scalable encoding/decoding of a moving image and, more particularly, to a scalable encoding/decoding apparatus and method for an 8-bit or larger moving image.

2. DESCRIPTION OF THE RELATED ART

Conventional moving image encoding/decoding technologies such as MPEG-2, MPEG-4, and JVT encode/decode a moving image of 8-bit pixels. In particular, MPEG-4 technology encodes/decodes a moving image of n bits, which is greater than eight bits, by, for example, expanding the dynamic scope of DCT coefficients or an Intra DC prediction table. However, when encoding/decoding a moving image of 12-bit pixels, the conventional technologies require a 12-bit based operation in a spatial domain and a 16(12+4)-bit based operation in a frequency domain for motion estimation and compensation. Therefore, the conventional technologies need complicated encoders and decoders that are very different from conventional 8-bit based moving image encoders and decoders. In addition, the conventional technologies do not support flexible encoding/decoding based on bit length.

SUMMARY OF THE INVENTION

The present invention provides a flexible encoding/decoding apparatus and method of a moving image with more than an 8-bit pixel value, using a conventional encoding/decoding technology of a moving image with an 8-bit pixel value.

According to an aspect of the present invention, there is provided a scalable moving image encoder including a pixel value clipper clipping a pixel value of an original image to a pixel value having a predetermined pixel depth; a base layer encoder receiving a clipped image and encoding the clipped image using a predetermined encoding method based on motion prediction; a pixel value scaler receiving a base layer image generated by the base layer encoder, which is a decoded image of an encoded image, and scaling a pixel depth of the base layer image to the pixel depth of the original image; and an enhancement layer encoder subtracting the base layer image having a scaled pixel value from the original image to produce an enhancement layer image and encoding the enhancement layer image using a predetermined encoding method.

The pixel value clipper may clip the pixel value of the original image by a predetermined number of bits from a most significant bit until the pixel value of the original image becomes a pixel value having the predetermined pixel depth.

The pixel value scaler may receive the base layer image and scale the pixel value of the base layer image to the pixel depth of the original image by listing the base layer image sequentially from a most significant bit, moving bits of the base layer image to a same number of high-order bits of the original image as the base layer image, and writing zero to remaining bits of the original image. In addition, the base layer encoder and the enhancement layer encoder may use an 8-bit based moving image encoding method.

According to another aspect of the present invention, there is provided a scalable moving image decoder including a base layer decoder receiving a base layer bit stream created by clipping a pixel value of an original image to a predetermined pixel depth and encoding a clipped image using a predetermined encoding method based on motion prediction, decoding the base layer bit stream, and outputting a decoded base layer image; an enhancement layer decoder receiving an enhancement layer bit stream created by subtracting the decoded base layer image having a scaled pixel value from the original image and encoding the image obtained by subtraction using a predetermined encoding method and decoding the enhancement layer bit stream; and a pixel value scaler receiving the decoded base layer image and scaling a pixel value of the decoded base layer image to the pixel depth of the original image.

The scalable moving image decoder may further include an adder adding a decoded enhancement layer image output from the enhancement layer decoder to a scaled base layer image output from the pixel value scaler and outputting the result of addition.

According to another aspect of the present invention, there is provided a scalable moving image encoding method including clipping a pixel value of an original image to a pixel value having a predetermined pixel depth; receiving a clipped image and encoding the clipped image using a predetermined encoding method based on motion prediction; receiving a decoded image of an encoded image and scaling a pixel value of the decoded image to the pixel depth of the original image; and subtracting a scaled image having a scaled pixel value from the original image and encoding a subtracted image using a predetermined encoding method.

According to another aspect of the present invention, there is provided a scalable moving image decoding method including receiving a base layer bit stream created by clipping a pixel value of an original image to a pixel value having a predetermined pixel depth, encoding a clipped image using a predetermined encoding method based on motion prediction and decoding the base layer bit stream, and outputting a decoded base layer image; receiving an enhancement layer bit stream created by subtracting the decoded base layer image having a scaled pixel value from the original image and encoding the image obtained by subtraction using a predetermined encoding method and decoding the enhancement layer bit stream; and receiving the decoded base layer image and scaling a pixel value of the decoded base layer image to the pixel depth of the original image.

The scalable moving image decoding method may further include adding a decoded enhancement layer image output from the enhancement layer decoder to a scaled base layer image output from the pixel value scaler and outputting the result of addition.

BRIEF DESCRIPTION OF THE DORIGINALINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art.

Figure 1:
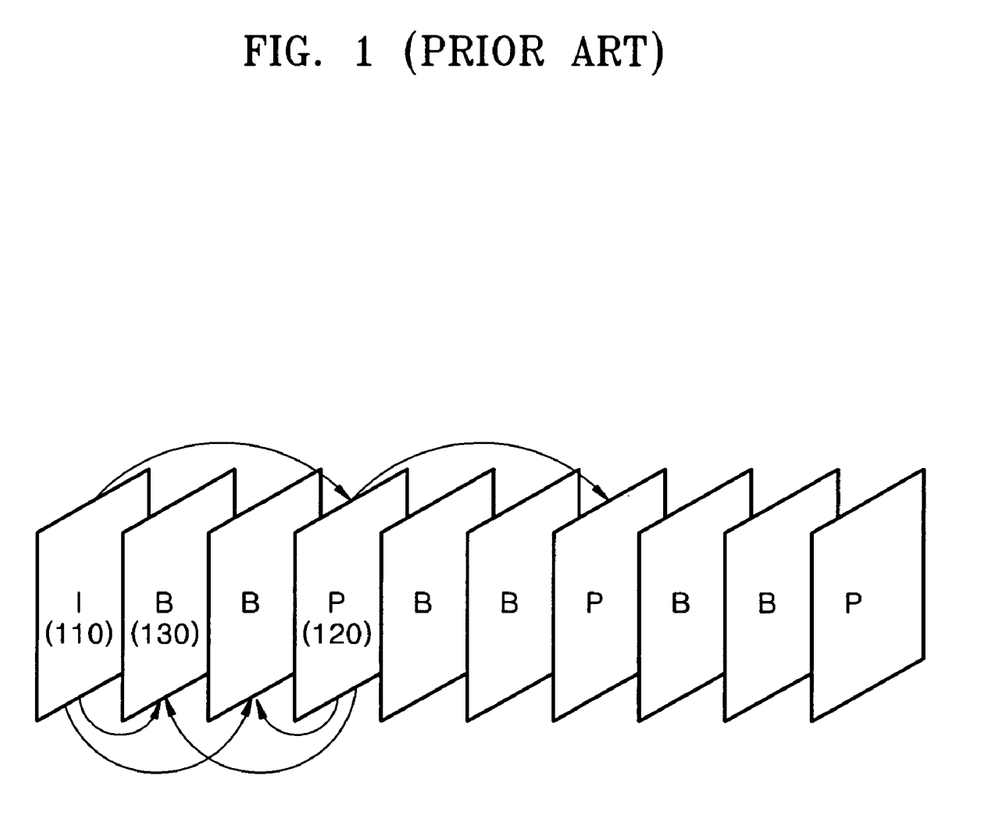
FIG. 1 illustrates video frames included in a moving image.

FIG. 1 illustrates moving image frames included in a moving image. Moving image data is encoded and decoded based on a motion prediction technology. A prediction is made with reference to a previous frame or both previous and future frames based on a time axis. A frame referred to when encoding or decoding a current frame is called a reference frame. In block-based moving image encoding, a still image (frame) included in a moving image is divided into a macro-block and a macro-block is divided into sub-blocks. Therefore, the motion of the still image is predicted and encoded on a block-by-block basis.

Referring to FIG. 1, a moving image includes a series of still images. The still images are classified by group of pictures (GOP), and each of the still images is called a frame. One GOP includes an I frame 110, a P frame 120, and a B frame 130. The I frame 110 is encoded without using a reference frame. On the other hand, the P frame 120 and the B frame 130 are encoded by motion estimation and compensation using the reference frame.

Figure 2:
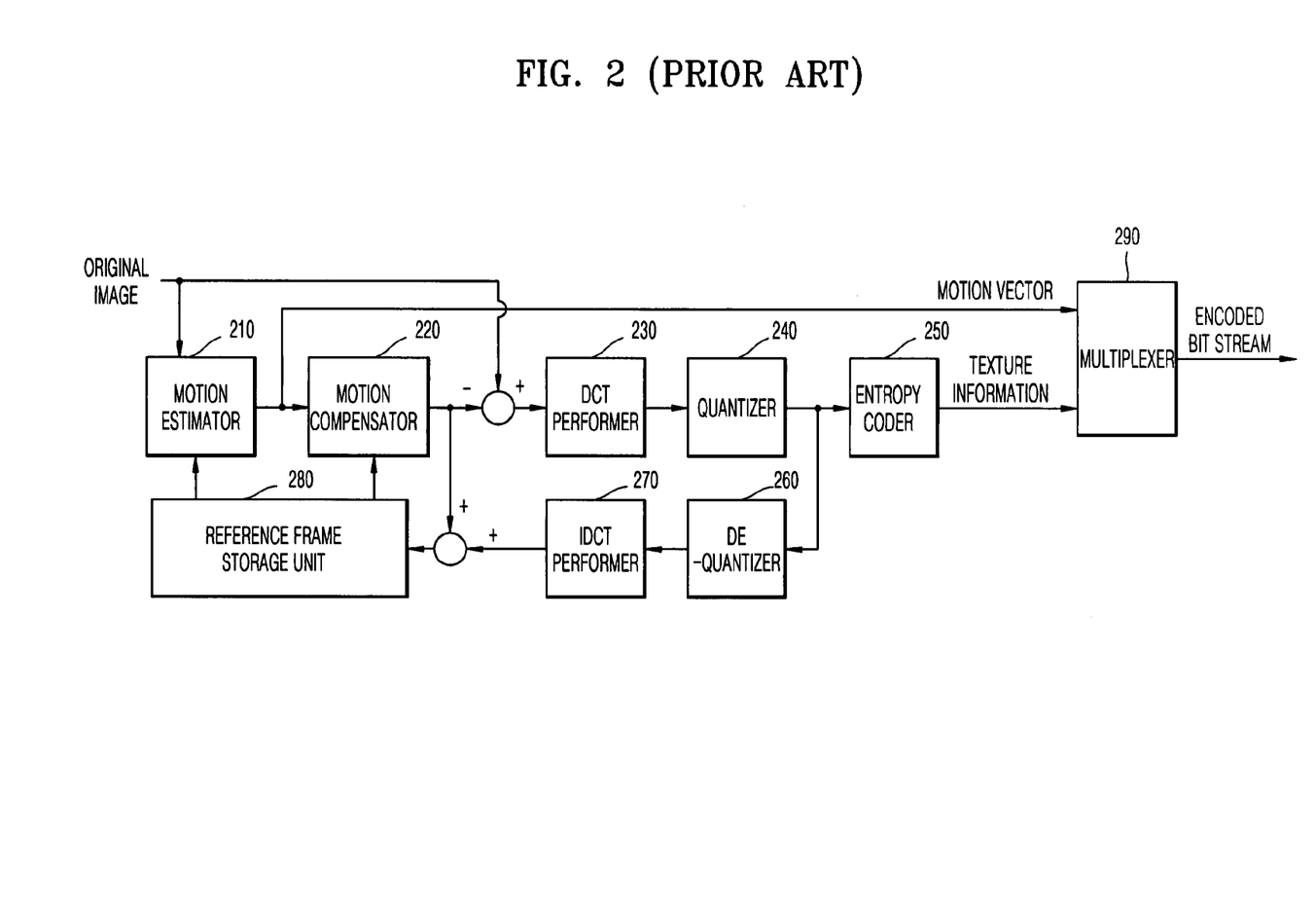
FIG. 2 is a block diagram of a conventional moving image encoder.

FIG. 2 is a block diagram of a conventional moving image encoder. The moving image encoder includes a motion estimator 210, a motion compensator 220, a discrete cosine transform (DCT) performer 230, a quantizer 240, an entropy coder 250, a de-quantizer 260, an inverse DCT (IDCT) performer 270, a reference frame storage unit 280, and a multiplexer 290.

The motion estimator 210 searches the reference frame for a macro-block and outputs the difference between the position of an image in the macro-block of the reference frame and the position of the image in a macro-block of a current frame as a motion vector. In other words, the motion estimator 210 searches for a desired macro-block within a predetermined search area of the reference frame, finds a macro block most similar to what was desired, and outputs the distance travelled by the image, which is the difference between the position of the image in the macro-block of the reference frame and that of the image in the macro-block of the current frame, as a motion vector. The motion compensator 220 extracts a prediction macro-block corresponding to the motion vector from the reference frame and motion-compensates for the prediction macro-block of the reference frame.

Then, the motion-compensated prediction macro-block of the reference frame is subtracted from the macro-block of the current frame. The DCT performer 230 DCTs the result of the subtraction and outputs a DCT coefficient. The quantizer 240 quantizes the DCT coefficient and transmits the quantized DCT coefficient to the entropy coder 250. The entropy coder 250 codes the quantized DCT coefficient and outputs texture information. The multiplexer 290 multiplexes the texture information together with the motion vector and outputs an encoded bit stream. When the current frame is the I frame, the DCT performer 230 DCTs the macro-block of the current frame without motion estimation and compensation and outputs a DCT coefficient. Then, the DCT coefficient is quantized, coded, and multiplexed by the quantizer 240, the entropy coder 250, and the multiplexer 290, respectively, and finally output as an encoded bit stream.

A value obtained by subtracting the motion-compensated macro-block of the reference image frame from the macro-block of the current frame is called a residual value. The residual value is encoded to reduce data volume when encoding. Since errors occur in a quantizing process, a moving image created as a bit stream contains the errors that occurred in the DCT and the quantizing processes.

To obtain a reference frame, a quantized residual signal is passed through the de-quantizer 260 and the IDCT performer 270, combined with a motion-estimated/compensated image, and stored in the reference frame storage unit 280. When the current frame is the I frame, it is stored in the reference frame storage unit 280 via the de-quantizer 260 and the IDCT performer 270 without motion-compensation. Therefore, a reference frame stored in the reference frame storage unit 280 includes the current frame with an encoded error that occurred in the DCT and the quantizing processes.

In other words, it is assumed that an original image (frame) is A and a predicted image (frame) after motion-estimation/compensation is B. The DCT performer 230 receives A−B, which is a difference between the original image and the predicted image, and DCTs the A−B. Since an error component E is created in the quantizing process, a bit stream output from the IDCT performer 270 via the entropy coder 250 is (A−B)+E. Then, the predicted image B is added to (A−B)+E. Therefore, A+E, that is, the original image plus the error component E, is stored in the reference frame storage unit 280 as a reference frame.

Figure 3:
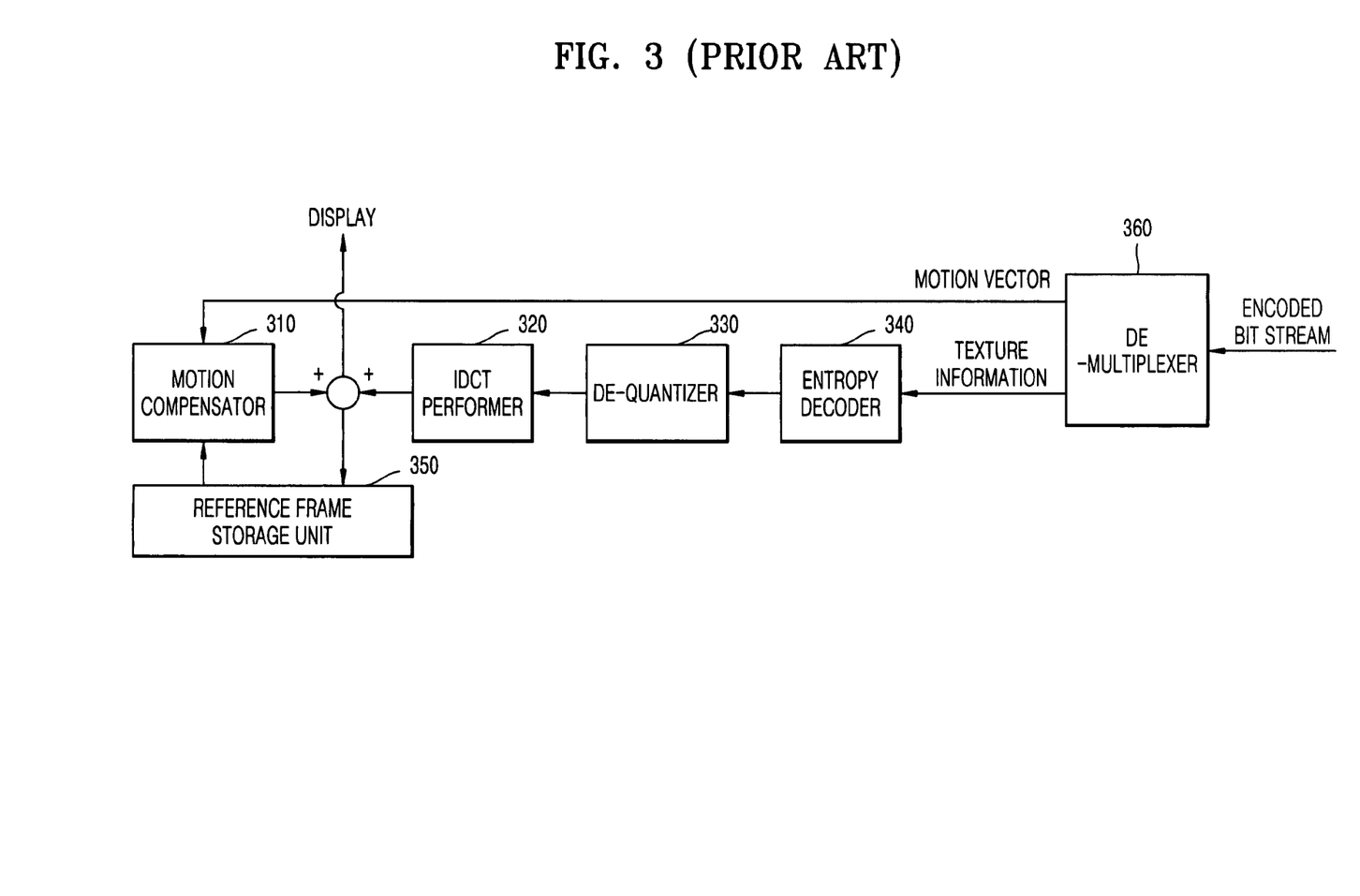
FIG. 3 is a block diagram of another conventional moving image decoder.

FIG. 3 is a block diagram of a conventional moving image decoder.

The moving image decoder includes a motion compensator 310, an IDCT performer 320, a de-quantizer 330, an entropy decoder 340, a reference frame storage unit 350, and a de-multiplexer 360.

The encoded bit stream output from the moving image encoder of FIG. 2 is divided into a motion vector and texture information by the de-multiplexer 360. The motion vector is transmitted to the motion compensator 310, and the texture information is decoded by the entropy coder 340, the de-quantizer 330, and the IDCT performer 320. The motion compensator 310 receives reference frame information from the reference frame storage unit 350 and motion vector information from the moving image encoder of FIG. 2 and outputs a predicted image. Then, the predicted image is combined with a decoded image, and a combined image is displayed.

Figure 4:
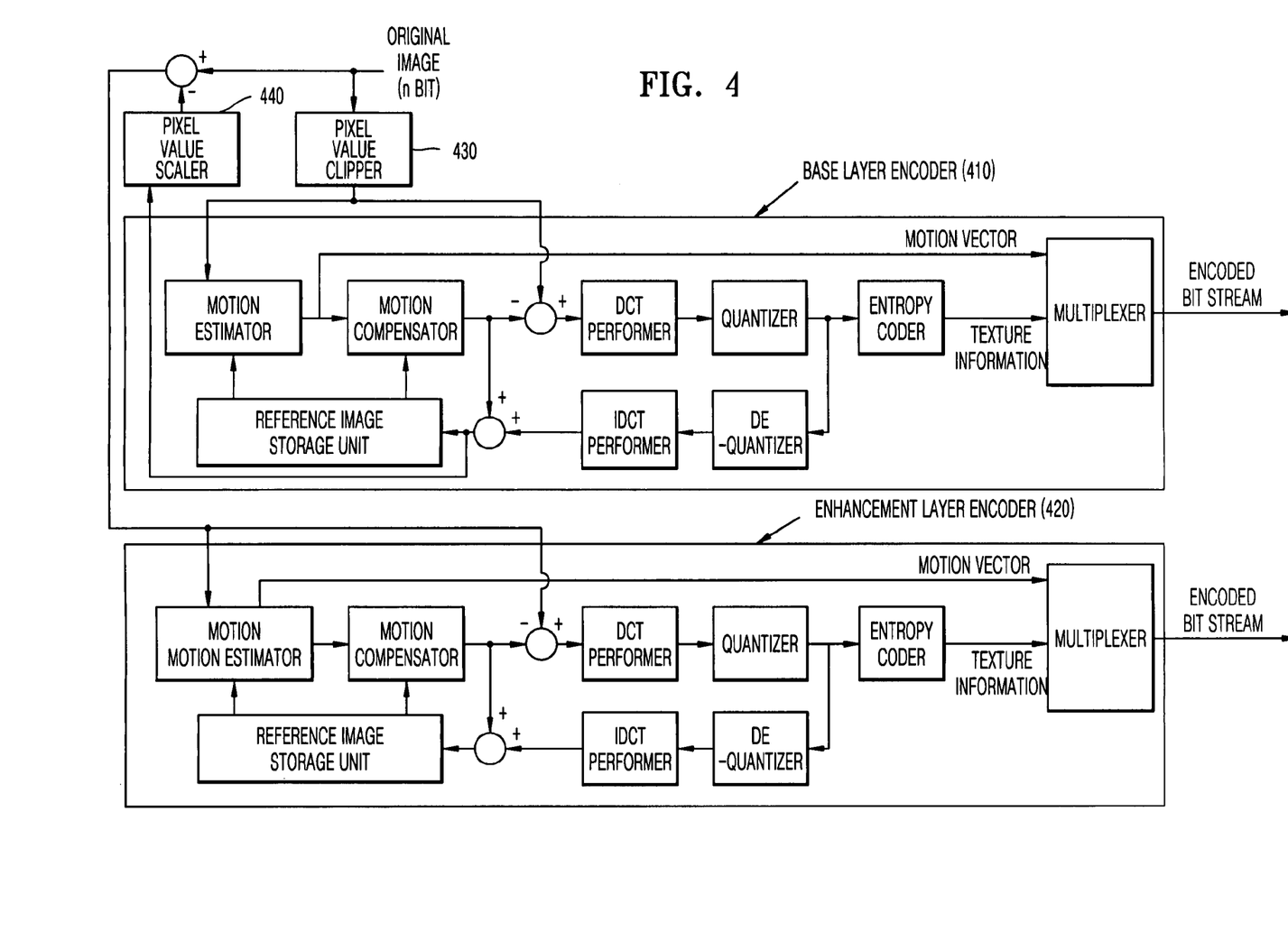
FIG. 4 is a block diagram of a scalable moving image encoder according to an exemplary embodiment of the present invention.

FIG. 4 is a block diagram of a scalable moving image encoder according to an exemplary embodiment of the present invention.

The scalable moving image encoder includes a base layer encoder 410, an enhancement layer encoder 420, a pixel value clipper 430, and a pixel value scaler 440.

A moving image of any pixel depth may be input to the base layer encoder 410 and the enhancement encoder 420, which may process a moving image of any number of bits. Therefore, in this embodiment of the present invention, scalable encoding in which an n-bit moving image is processed as an 8-bit moving image will be described. An n-bit original moving image is converted into an 8-bit moving image by the pixel value clipper 430. The 8-bit moving image is encoded by the base layer encoder 410 using a general 8-bit moving image encoding method.

A decoded image by the base layer encoder 410 is stored in a reference image storage such that the decoded image can be used for motion-estimation/compensation when the base layer encoder 410 performs encoding. To create an enhancement layer bit stream, the decoded image is also transmitted to the pixel scaler 440 and scaled to the same number of bits (n bits) as the original image. A scaled image is subtracted from the original image, and the image resulting from the subtraction is transmitted to the enhancement layer encoder 420. The enhancement layer encoder 420 is a general 8-bit moving image encoder that performs encoding based on motion-prediction. In the embodiment of the present invention, the base layer encoder 410 and the enhancement layer encoder 420 may use MPEG-1, MPEG-2, MPEG-4, and H.264 encoding methods.

Figure 5:
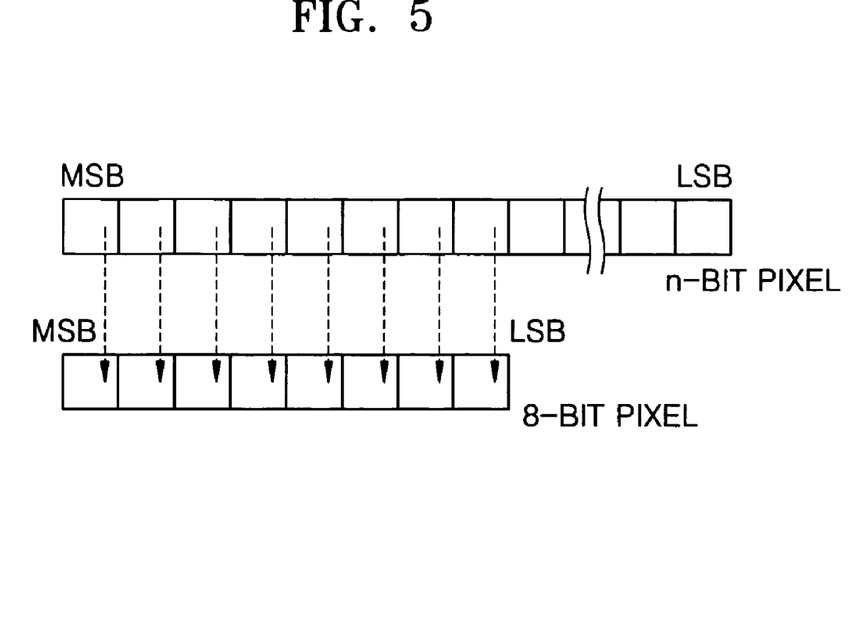
FIG. 5 illustrates a case where a pixel value clipper clips an n-bit pixel value to an 8-pixel value.

FIG. 5 illustrates a case where the pixel value clipper 430 clips an n-bit pixel value to an 8-pixel value. To convert the n-bit pixel value into the 8-bit pixel value, eight high-order bits of the n-bit pixel value are clipped. In other words, eight high-order bits of the n-bit pixel value are cut to obtain the 8-bit pixel value composed of only eight most significant bits (MSB) of the pixel value of the original image.

Figure 6:
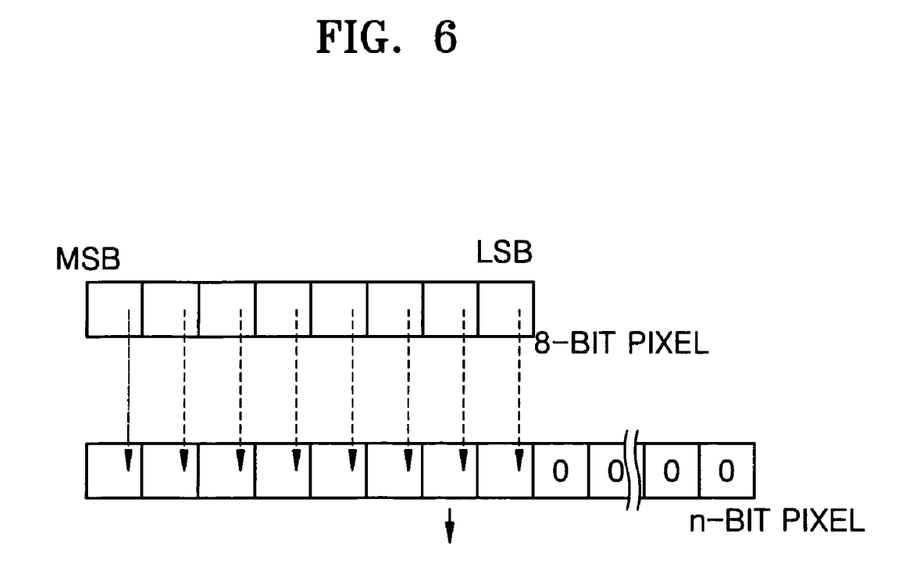
FIG. 6 illustrates a case where a pixel value scaler scales an 8-bit pixel value to an n-bit pixel value.

FIG. 6 illustrates a case where the pixel value scaler 440 scales an 8-bit pixel value to an n-bit pixel value.

To scale the 8-bit pixel value to the n-bit pixel value, eight bits of the 8-bit pixel value are moved to eight high-order bits of the n-bit pixel value, and zero is written to remaining bits of the n-bit pixel value. In this way, the 8-bit pixel value can be scaled to the n-bit pixel value.

Figure 7:
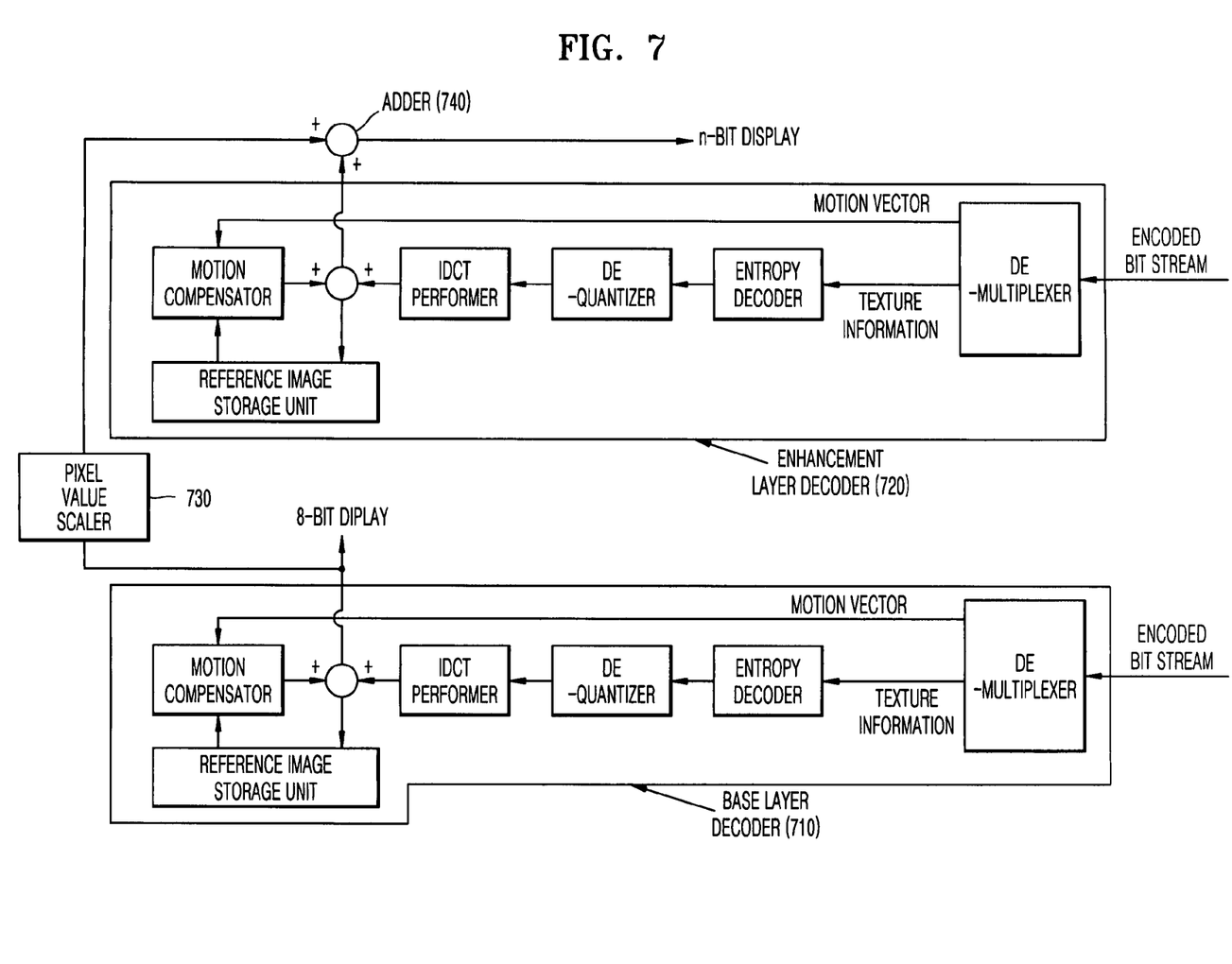
FIG. 7 is a block diagram of a scalable moving image decoder according to an exemplary embodiment of the present invention.

FIG. 7 is a block diagram of a scalable moving image decoder according to an exemplary embodiment of the present invention.

The scalable moving image decoder includes a base layer decoder 710, an enhancement decoder 720, a pixel value scaler 730, and an adder 740.

In this exemplary embodiment of the present invention, the base layer encoder 710 and the enhancement layer decoder 720 may use MPEG-1, MPEG-2, MPEG-4, and H.264 decoding methods, which use 8-bit moving images.

The base layer decoder 710, which receives an encoded bit stream (hereinafter, referred to as a base layer bit stream) output from the base layer encoder 410 of FIG. 4, decodes the encoded base layer bit stream into an 8-bit moving image, stores the decoded 8-bit moving image in a reference image storage, and outputs the decoded 8-bit moving image to a pixel value scaler 730. The pixel scaler 730 scales the 8-bit moving image to the n-bit moving image. The scaling process has been described above with reference to FIG. 6.

The enhancement layer decoder 720 receives an encoded bit stream (hereinafter, referred to as an enhancement layer bit stream) output from the enhancement layer encoder 420 of FIG. 4 and decodes the enhancement layer bit stream based on motion prediction. The adder 740 combines an image output from the pixel value scaler 730 and an image output from the enhancement layer decoder 720 into an n-bit image. In some cases, only an image decoded by the base layer decoder 710 may be decoded. In other words, when a network is not stable or when a lot of errors occur, only the base layer bit stream can be decoded and output even though its image quality is not so good. Therefore, scalable decoding is possible.

Figure 8:
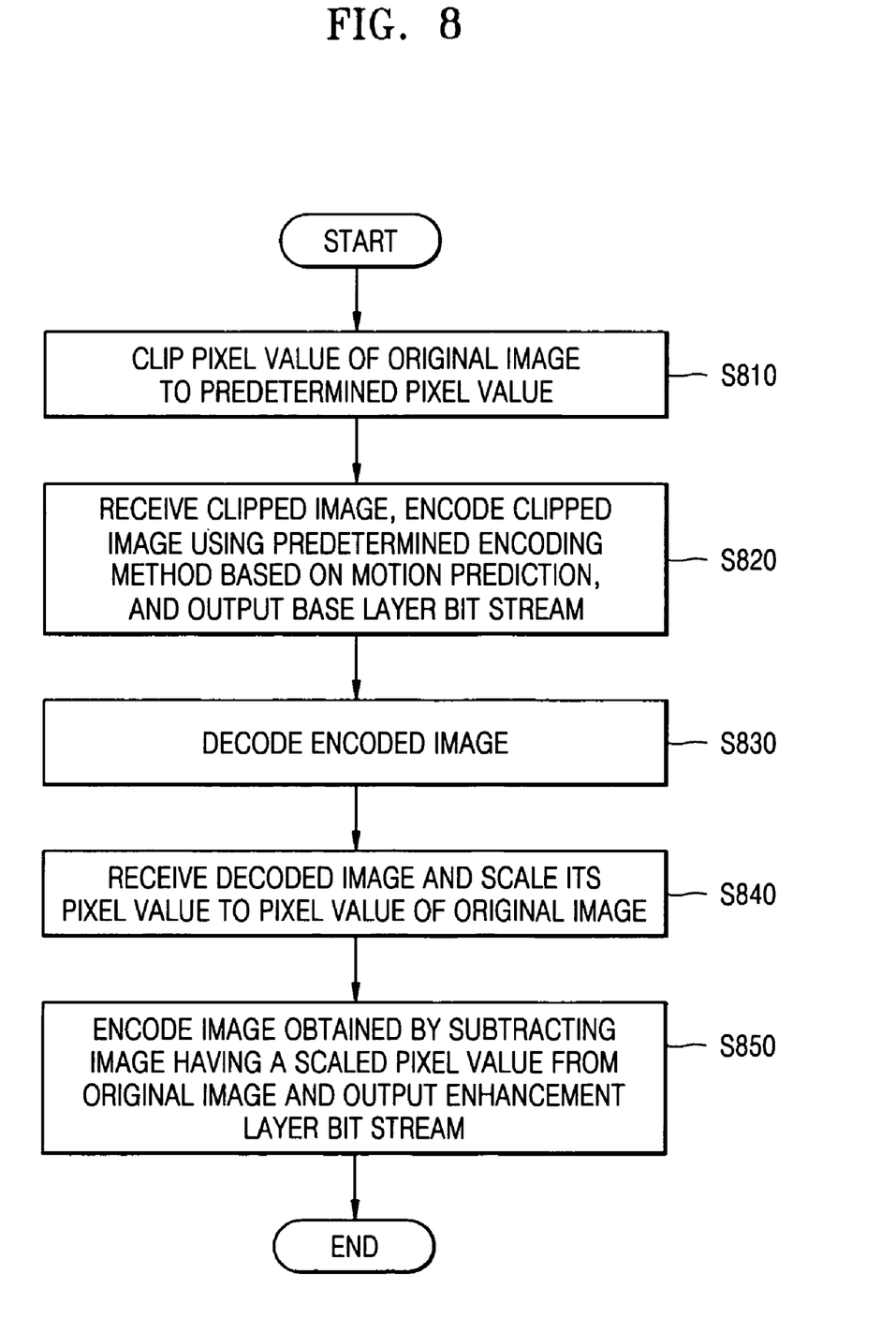
FIG. 8 is a flowchart illustrating a scalable moving image encoding method according to an exemplary embodiment of the present invention.

FIG. 8 is a flowchart illustrating a scalable moving image encoding method according to an exemplary embodiment of the present invention. Referring to FIG. 8, a pixel value of an original image is converted into a pixel value that can be processed by a decoder (Operation S810). Since an 8-bit decoder is used in the present invention, the pixel value of the original image is clipped to the 8-bit pixel value. As described with reference to FIG. 5, 8 bits from the MSB are cut from the pixel value of the original image until the 8-bit pixel value is obtained.

The base layer encoder 410, which receives a clipped image, encodes the clipped image using a predetermined encoding method based on motion prediction, and outputs an encoded image as a base layer bit stream (Operation S820). Here, the encoding method may be a lossy encoding method. Then, the encoded image is decoded (Operation S830). A pixel value of the decoded image is scaled to the pixel value of the original image (Operation S840). The pixel value scaler 440 receives the decoded image and scales the pixel value (8-bit pixel value) of the decoded image to the pixel value (n-bit pixel value) of the original image by listing the decoded image sequentially from the MSB, moving 8 bits of the 8-bit value to eight high-order bits of the n-bit pixel value, and writing zero to the remaining bits of the n-bit pixel value of the original image. Then, a scaled image is subtracted from the original image. The enhancement layer encoder 420 encodes a subtracted image using a predetermined encoding method and outputs an enhancement layer bit stream (Operation S850).

Figure 9:
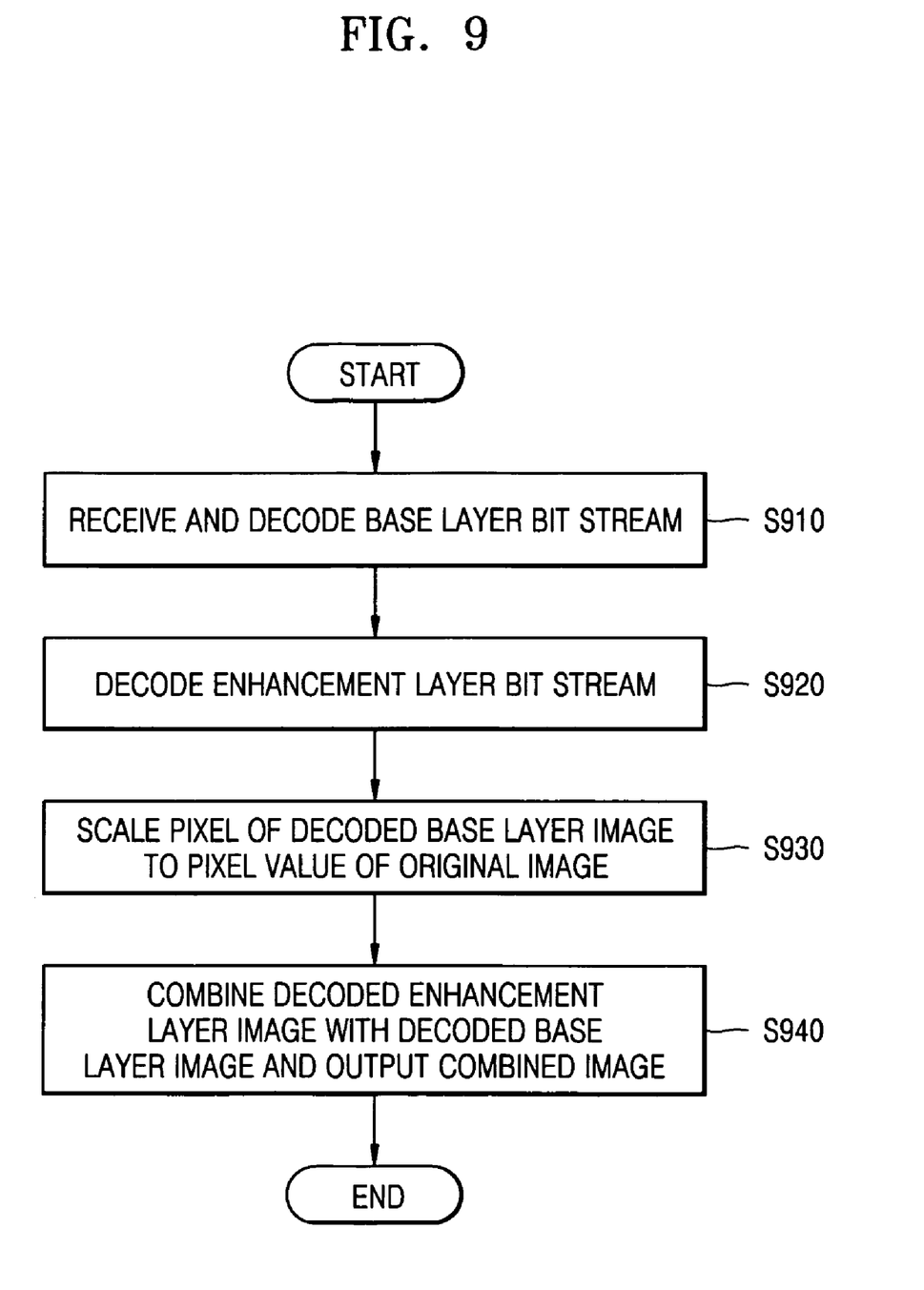
FIG. 9 is a flowchart illustrating a scalable moving image decoding method according to an exemplary embodiment of the present invention.

FIG. 9 is a flowchart illustrating a scalable decoding method of a moving image according to an exemplary embodiment of the present invention. Referring to FIG. 9, the base layer decoder 710 receives a base layer bit stream created by clipping a pixel value of an original image to a pixel value having a predetermined pixel depth and encoding the clipped image using a predetermined encoding method based on motion prediction by the base layer encoder 410. The base layer decoder 710 decodes the base layer bit stream and outputs a decoded base layer image (Operation S910). The enhancement layer decoder 720, which receives an enhancement layer bit stream from the enhancement layer encoder 420, decodes the enhancement layer bit stream and outputs a decoded enhancement layer image (Operation S920).

The pixel value scaler 730 receives the decoded base layer image and scales a pixel value of the decoded base layer image to the pixel value of the original image (Operation S930). The scaling process has been described above. The adder 740 adds the decoded enhancement layer image to the decoded base layer image having a scaled pixel value and outputs the result of the addition (Operation S940).

When a network is not stable or when a lot of errors occur, only the base layer bit stream may be decoded and output even though its image quality is not so good. The scalable moving image encoding and decoding method described above may be written as a computer program. Codes and code segments of the computer program may be easily derived by computer programmers of ordinary skill in the art. The computer program is recorded onto a computer-readable recording medium. The scalable moving image encoding and decoding method is implemented when the computer program is read and executed by a computer. The computer readable recording medium includes a magnetic recording medium, an optical recording medium, and a carrier wave medium.

As described above, a moving image encoding/decoding apparatus and method according to the present invention may store and transmit an n-bit moving image after encoding the n-bit moving image, using an 8-bit moving image encoding/decoding technology, and decode and reproduce the n-bit moving image.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A scalable moving image encoder comprising:
   a pixel value clipper which clips a pixel value of an original image to a pixel value having a predetermined pixel depth;
   a base layer encoder which receives a clipped image and encodes the clipped image using a first predetermined encoding method based on motion prediction;
   a pixel value scaler which receives a base layer image generated by the base layer encoder, which is a decoded image of an encoded image, and scaling a pixel depth of the base layer image to a pixel depth of the original image; and
   an enhancement layer encoder which subtracts the base layer image having a scaled pixel value from the original image to produce an enhancement layer image and encodes the enhancement layer image using a second predetermined encoding method,
   wherein the enhancement layer encoder comprises a motion estimator and a motion compensator, and the second predetermined encoding method used to encode the enhancement layer image is based on another motion prediction.

2. The scalable moving image encoder of claim 1, wherein the pixel value clipper clips the pixel value of the original image by a predetermined number of bits from a most significant bit until the pixel depth of the original image becomes equal to the predetermined pixel depth.

3. The scalable moving image encoder of claim 1, wherein the pixel value scaler receives the base layer image and scales the pixel value of the base layer image to the pixel value of the original image by listing bits of the pixel value of the base layer image sequentially from a most significant bit, moving the bits of the pixel value of the base layer image to high-order bit positions of a scaled pixel value having a same number of bits as the pixel value of the original image, and writing zeros to remaining bit positions of the scaled pixel value.

4. The scalable moving image encoder of claim 1, wherein the base layer encoder and the enhancement layer encoder use an 8-bit based moving image encoding method.

5. A scalable moving image decoder comprising:
   a base layer decoder which receives a base layer bit stream created by clipping a pixel value of an original image to a predetermined pixel depth and encoding a clipped image using a first predetermined encoding method based on motion prediction, decodes the base layer bit stream, and outputs a decoded base layer image;
   an enhancement layer decoder which receives an enhancement layer bit stream created by subtracting a reference base layer image having a scaled pixel value from the original image and encoding an image obtained by the subtracting using a second predetermined encoding method, decodes the enhancement layer bit stream, and outputs a decoded enhancement layer image; and
   a pixel value scaler which receives the decoded base layer image and scales a pixel value of the decoded base layer image to a pixel depth of the original image,
   wherein the enhancement layer decoder comprises a motion compensator, and decodes the enhancement layer image bit stream based on another motion prediction.

6. The scalable moving image decoder of claim 5, further comprising an adder which adds the decoded enhancement layer image output from the enhancement layer decoder to a scaled base layer image output from the pixel value scaler and outputs a result of addition.

7. The scalable moving image decoder of claim 5, wherein the pixel value scaler receives the decoded base layer image from the base layer decoder and scales the pixel value of the decoded base layer image to the pixel depth of the original image by listing bits of the pixel value of the decoded base layer image sequentially from a most significant bit, moving the bits of the pixel value of the decoded base layer image to high-order bit positions of a scaled pixel value having the same number of bits as the pixel value of the original image, and writing zeros to remaining bit positions of the scaled pixel value.

8. The scalable moving image decoder of claim 5, wherein the base layer decoder and the enhancement layer decoder are 8-bit decoders.

9. A scalable moving image encoding method comprising:
   clipping a pixel value of an original image to a pixel value having a predetermined pixel depth;
   receiving a clipped image and encoding the clipped image using a first predetermined encoding method based on motion prediction;
   receiving a decoded image of an encoded image and scaling a pixel value of the decoded image to the pixel depth of the original image; and
   subtracting a scaled image having a scaled pixel value from the original image and encoding a subtracted image using a second predetermined encoding method,
   wherein the second predetermined encoding method used to encode the subtracted image is based on another motion prediction.

10. The method of claim 9, wherein the clipping of the pixel value of the original image comprises clipping the pixel value of the original image by a predetermined number of bits from a most significant bit to the predetermined pixel depth.

11. The method of claim 9, wherein the receiving of the decoded image and the scaling of the pixel value of the decoded image comprises receiving the decoded image and scaling the pixel value of the decoded image to the pixel depth of the original image by listing bits of the pixel value of the decoded image sequentially from a most significant bit, moving the bits of the pixel value of the decoded image to high-order bit positions of a scaled pixel value having the same number of bits as the pixel value of the original image, and writing zeros to remaining bit positions of the scaled pixel value.

12. The method of claim 9, wherein the predetermined number of bits is eight, and an 8-bit based encoding method is used for the receiving and encoding of the clipped image and the subtracting of the scaled image and the encoding of the subtracted image.

13. A scalable moving image decoding method comprising:
- receiving a base layer bit stream created by clipping a pixel value of an original image to a pixel value having a predetermined pixel depth and encoding a clipped image using a first predetermined encoding method based on motion prediction, decoding the base layer bit stream, and outputting a decoded base layer image;
- receiving an enhancement layer bit stream created by subtracting a reference base layer image having a scaled pixel value from the original image and encoding an image obtained by the subtracting using a second predetermined encoding method, decoding the enhancement layer bit stream, and outputting a decoded enhancement layer image; and
- receiving the decoded base layer image and scaling a pixel value of the decoded base layer image to a pixel depth of the original image,
- wherein the second predetermined encoding method is based on another motion prediction.

14. The method of claim 13, further comprising adding a decoded enhancement layer image output from an enhancement layer decoder to a scaled base layer image output from the pixel value scaler and outputting a result of addition.

15. The method of claim 13, wherein the receiving of the decoded base layer image and the scaling of the pixel value of the decoded base layer image comprises receiving the decoded base layer image from the base layer decoder and scaling the pixel value of the decoded base layer image to the pixel depth of the original image by listing bits of the pixel value of the decoded base layer image sequentially from a most significant bit, moving the bits of the pixel value of the decoded base layer image to high-order bit positions of a scaled pixel value having the same number of bits as the pixel value of the original image, and writing zeros to remaining bit positions of the scaled pixel value.

16. A non-transitory computer-readable recording medium recording a program executing a scalable moving image encoding method in a computer, the scalable moving image encoding method comprising:
- clipping a pixel value of an original image to a pixel value having a predetermined pixel depth;
- receiving a clipped image and encoding the clipped image using a first predetermined encoding method based on motion prediction;
- receiving a decoded image of an encoded image and scaling a pixel value of the decoded image to the pixel depth of the original image; and
- subtracting a scaled image having a scaled pixel value from the original image and encoding the image obtained by subtraction using a second predetermined encoding method,
- wherein the second predetermined encoding method used to encode the subtracted image is based on another motion prediction.

17. A non-transitory computer-readable recording medium recording a program executing a scalable moving image decoding method in a computer, the scalable moving image decoding method comprising:
- receiving a base layer bit stream created by clipping a pixel value of an original image to a pixel value having a predetermined pixel depth and encoding a clipped image using a first predetermined encoding method based on motion prediction, decoding the base layer bit stream, and outputting a decoded base layer image;
- receiving an enhancement layer bit stream created by subtracting a reference base layer image having a scaled pixel value from the original image and encoding the image obtained by the subtracting using a second predetermined encoding method, decoding the enhancement layer bit stream, and outputting a decoded enhancement layer image; and
- receiving the decoded base layer image and scaling a pixel value of the decoded base layer image to a pixel depth of the original image,
- wherein the second predetermined encoding method is based on another motion prediction.

* * * * *